UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

PRODUCING AMMONIUM SULFATE.

1,106,919.

Specification of Letters Patent. Patented Aug. 11, 1914.

No Drawing. Application filed April 19, 1913. Serial No. 762,376.

*To all whom it may concern:*

Be it known that I, CARL BOSCH, Ph. D., chemist, citizen of the German Empire, residing at Ludwigshafen-on-the-Rhine, Germany, have invented new and useful Improvements in Producing Ammonium Sulfate, of which the following is a specification.

It has been known since 1880 that a solution of ammonium bisulfite, when heated in a sealed glass tube to a temperature of about 150° C., is converted into sulfate of ammonia, sulfur and sulfuric acid (see *Berichte*, 13, 2325). The specifications of Patent No. 1,063,007 and of application for patent Serial No. 743,281 describe particular modifications showing how this reaction can be carried out on a manufacturing scale, one of these processes depending on the presence of a catalyst during the reaction. In carrying out the above reactions, if concentrated solutions of bisulfite are employed, a part of the ammonium sulfate crystallizes out, especially if the free sulfuric acid formed be neutralized, and the other part of the ammonium sulfate contained in the mother liquor could only be obtained by evaporation. I have found, however, that the expensive operation of evaporating can be avoided if the ammonium sulfate liquor, either directly or after removing that part of the ammonium sulfate which is crystallized out, be treated with ammonia and with sulfurous acid, or with ammonium bisulfite, which for the purposes of this invention is equivalent to ammonia and sulfurous acid, so that the said mother liquor is almost or completely saturated with bisulfite. In this case a large separation of the ammonium sulfate is caused to take place from the liquor and it can be removed therefrom. The reaction which takes place may be represented by the following equation:—

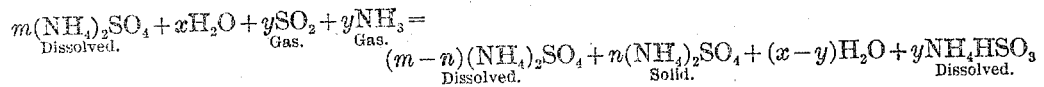

The process of the present invention possesses the further advantage that, after removing the ammonium sulfate, a concentrated solution of ammonium bisulfite is obtained, and this solution can be immediately employed for further conversion into ammonium sulfate by the application of heat either in the presence, or absence, of a catalyst as described, for instance, in the specifications of Patent No. 1,063,007 and of application Serial No. 743,281.

If desired, in addition to the ammonium bisulfite which is employed according to this invention, some ammonium sulfite may be employed without departing from the nature of the invention. The reaction which then takes place may be represented by the following equation:

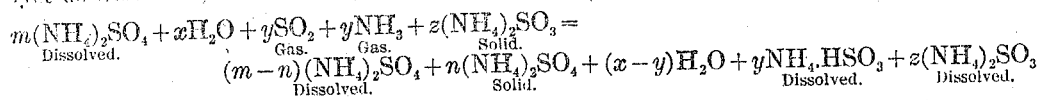

The presence of ammonium sulfite often offers advantages as described in the aforesaid specifications of Patent No. 1,063,007 and application Serial No. 743,281. For instance, if a solution of ammonium bisulfite be heated by itself some sulfuric acid is formed, whereas if, in addition, some ammonium sulfite be present it helps to diminish the formation of free sulfuric acid, and a reaction can be brought about as represented by the equation:—

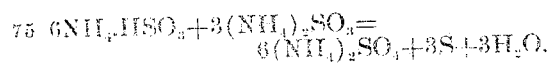

Now what I claim is:—

1. In the production of ammonium sulfate from ammonium bisulfite, causing the precipitation of ammonium sulfate from a solution thereof by the addition of ammonia and sulfurous acid.

2. In the production of ammonium sulfate from ammonium bisulfite, adding ammonia, sulfurous acid and ammonium sulfite to a solution of ammonium sulfate, thus causing a precipitation of the ammonium sulfate.

3. The process of producing ammonium sulfate in the solid form by suitably heating a solution of ammonium bisulfite and then adding ammonia and sulfurous acid to the solution of the ammonium sulfate thus obtained.

4. The process of producing ammonium sulfate in the solid form by suitably heating a solution containing ammonium bisulfite and ammonium sulfite, and then adding ammonia and sulfurous acid to the solution of ammonium sulfate thus obtained.

5. The process of producing ammonium sulfate in the solid form by suitably heating a solution of ammonium bisulfite and then adding ammonia and sulfurous acid to the solution of ammonium sulfate thus obtained, then separating the solid ammonium sulfate from the liquid portion and subjecting the separated liquid portion to suitable heating for the production of further ammonium sulfate.

6. The process of producing ammonium sulfate in the solid form by suitably heating a solution containing ammonium bisulfite and ammonium sulfite, and then adding ammonia and sulfurous acid to the solution of ammonium sulfate thus obtained, then separating the solid ammonium sulfate from the liquid portion and subjecting the separated liquid portion to suitable heating for the production of further ammonium sulfate.

7. The process of producing ammonium sulfate in the solid form by suitably heating a solution of ammonium bisulfite and then adding ammonia and sulfurous acid to the solution of ammonium sulfate thus obtained, then separating the solid ammonium sulfate from the liquid portion and subjecting the separated liquid portion to suitable heating with a catalyst for the production of further ammonium sulfate.

8. The process of producing ammonium sulfate in the solid form by suitably heating a solution containing ammonium bisulfite and ammonium sulfite, and then adding ammonia and sulfurous acid to the solution of ammonium sulfate thus obtained, then separating the solid ammonium sulfate from the liquid portion and subjecting the separated liquid portion to suitable heating with a catalyst for the production of further ammonium sulfate.

In testimony whereof I have hereunto set my hand in the presence of two subscribing witnesses.

CARL BOSCH.

Witnesses:
J. ALEC. LLOYD,
JOSEPH PFEIFFER.